Figure 1:
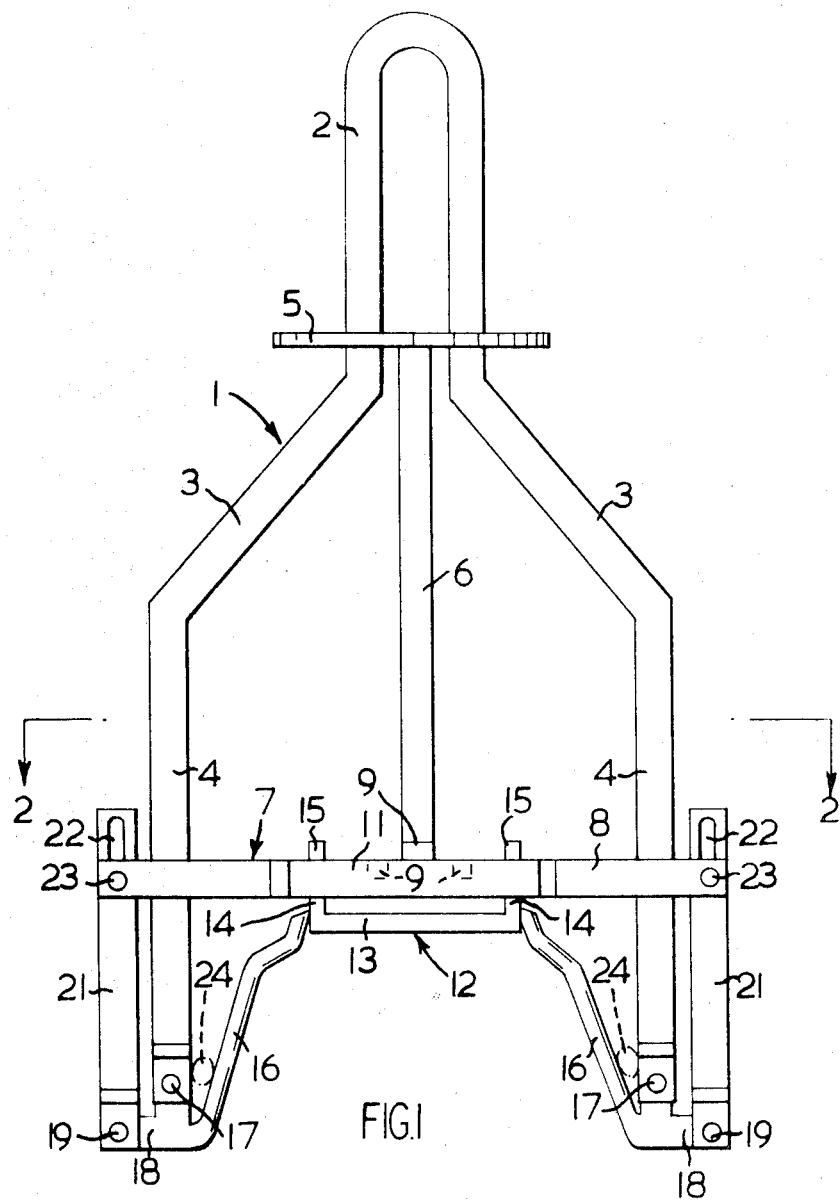

United States Patent

[11] 3,593,368

| | | |
|---|---|---|
| [72] | Inventor | John Henry Cox<br>R.R.#3, Lambeth, Ontario, Canada |
| [21] | Appl. No. | 869,458 |
| [22] | Filed | Oct. 27, 1969 |
| [45] | Patented | July 20, 1971 |
| [32] | Priority | Oct. 28, 1968 |
| [33] | | Canada |
| [31] | | 033,711 |

[54] AUTOMATIC POULTRY SHACKLE
5 Claims, 3 Drawing Figs.

[52] U.S. Cl. .................................................. 17/44.1, 17/11
[51] Int. Cl. ..................................................... A22c 21/00
[50] Field of Search ............................................. 17/11, 44.1

[56] References Cited
UNITED STATES PATENTS

| | | | |
|---|---|---|---|
| 2,688,765 | 9/1954 | Sharp et al. ................ | 17/44.1 |
| 3,023,453 | 3/1962 | Jensen ....................... | 17/44.1 |
| 3,132,373 | 5/1964 | Altenpohl, Jr. ............. | 17/44.1 |

*Primary Examiner*—Lucie H. Laudenslager
*Attorney*—Stevens, Davis, Miller & Moser

ABSTRACT: A poultry shackle includes a body having a pair of downwardly extending spaced legs and a pair of locking arms. Each locking arm is pivotally connected to the body. A crossmember slidably mounted on the body is connected to each locking arm by a lost-motion connection. The crossmember has a latch operable to maintain the locking arms in an upwardly extending closed position. Poultry legs can be wedged between the locking arms and the legs of the shackle. The crossmember is upwardly movable relative to the body to move the latch clear of the locking arms and, after taking up the lost motion, to cause angular movement of the locking arms away from the associated legs to an open position such that poultry is released from the shackle.

AUTOMATIC POULTRY SHACKLE

This invention relates to poultry shackles, that is to say shackles from which poultry can be suspended by the legs while it undergoes various stages of treatment to render it suitable for sale.

Requirements of such a shackle are that it should be relatively easy to fit poultry thereto, that it should firmly hold the poultry in place, and that it should be releasable in such a way as to insure discharge of the poultry therefrom. The shackle should also be satisfactory for use with poultry with differing leg thicknesses, for example turkey or chicken. The shackle should also be relatively inexpensive, reliable, and simple in operation.

Known poultry shackles have not satisfied these requirements, and it is therefore an object of this invention to provide an improved shackle which does satisfy these requirements.

According to this invention, a poultry shackle includes a body having a pair of downwardly extending spaced legs, a pair of locking arms, each locking arm being pivotally connected to the body, and a crossmember slidably mounted on the body, the cross member being connected to each locking arm by a lost-motion connection, and the cross member having a latch operable to maintain the locking arms in an upwardly extending closed position such that, in use, poultry legs can be wedged between the locking arms and the legs of the shackle, and the crossmember being upwardly movable relative to the body to move the latch clear of the locking arms and, after taking up said lost motion, to cause angular movement of the locking arms away from the associated legs to an open position such that poultry is released from the shackle.

The latch may be capable of a limited amount of movement relative to the crossmember to enable the locking arms to push past the latch if necessary during the closing movement.

Preferably, the locking arms are pivotally connected to the legs and are located between the legs. The crossmember may be connected to each locking arm by a link with a pin and slot connection to provide said lost motion.

Figure 2:
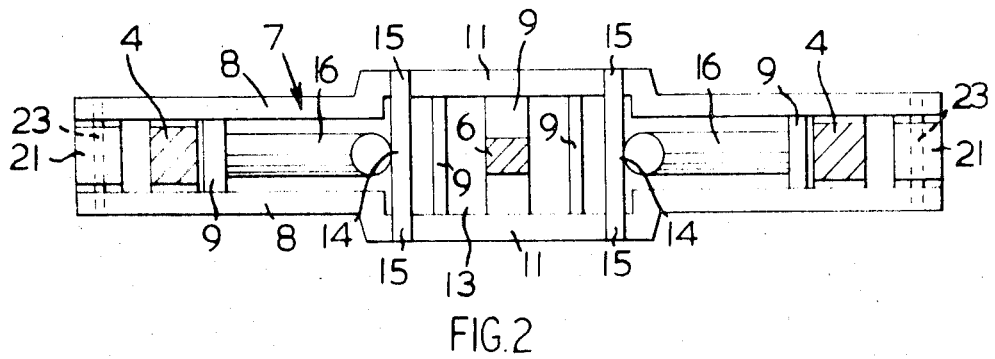
Figure 3:
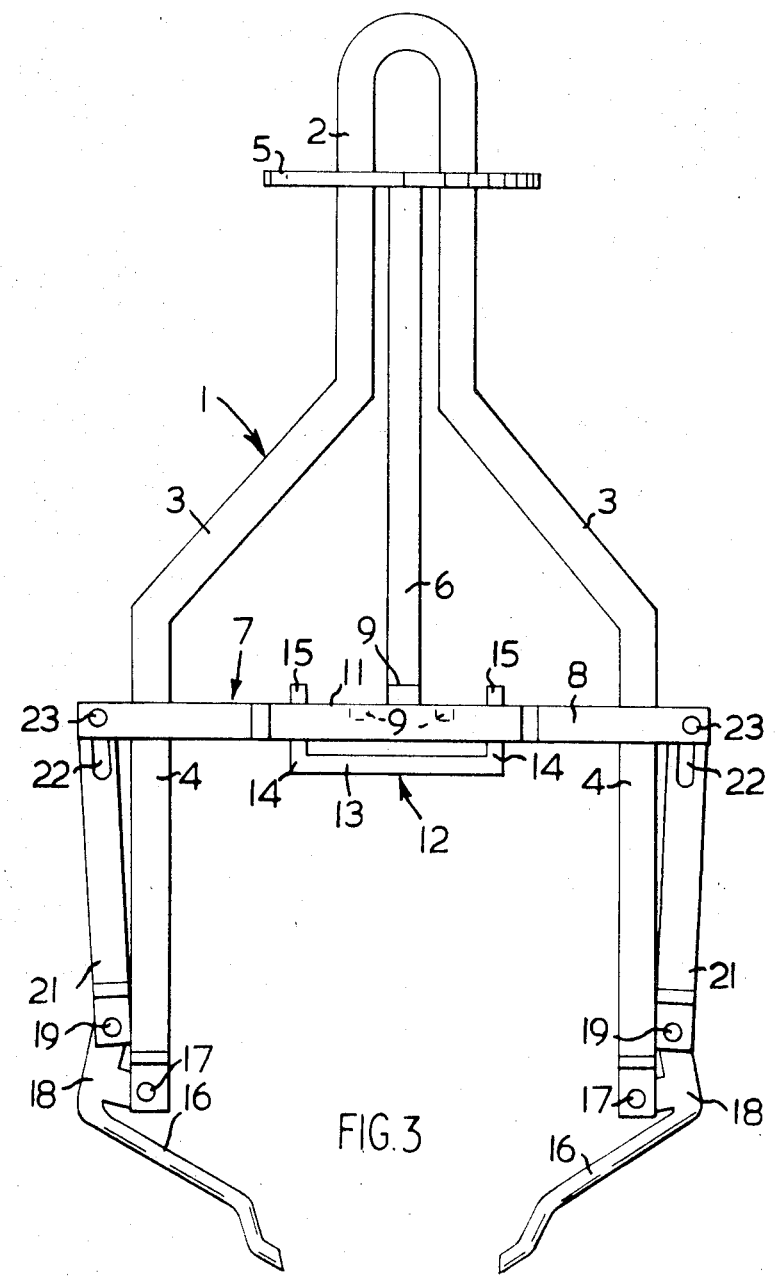

One embodiment of the present invention will now be described, by way of example, with reference to the accompanying drawings of which, FIG. 1 is a side view of a poultry shackle with the locking arms in the closed position, FIG. 2 is a sectional view along the line 2—2 of FIG. 1, and FIG. 3 is a side view of the shackle with the locking arms in the open position.

Referring to the accompanying drawings, an automatic poultry shackle includes a body 1 formed from a metal strip of rectangular cross section, the strip having been bent to provide an inverted U-shaped head portion 2 from the lower end of which extend two diverging portions 3. From the lower ends of the diverging portions 3 extend two parallel legs 4.

The body 1 carries a locking mechanism including an apertured disclike cam-operable trip 5 which is slidably mounted on the head portion 2 of the body 1. A bar 6 welded at its upper end to the trip 5 extends downwardly therefrom and is welded at its lower end to a cross frame 7 slidably mounted on the legs 4 of the body 1.

As shown particularly in FIG. 2, the cross frame 7 includes two spaced parallel side members 8 secured together by five connecting members 9, the bar 6 being welded to the central connecting member 9. The legs 4 are located between the side members 4. The medial portions 11 of the side members 8 are offset outwardly from the end portions to provide the cross frame 7 with a central space of greater width than the space between the end portions of the side members 8.

A movable latch 12 carried by the cross frame 7 is of U-shape and includes a base 13 located below the central portion of the cross frame 7, and two walls 14 extending upwardly from opposite ends of the base 13 through the central space. The upper ends of the walls 14 have lateral extensions 15 which overlie the medial portions 11 of side members 8 to limit downward movement of the latch 12 relative to the cross frame 7. Upward movement of the latch 12 relative to the cross frame 7 is limited by engagement of the base 13 with the adjacent crossmembers 9. The amount of possible vertical movement of the latch 12 relative to the cross frame 7 depends upon the height of the walls 14.

The locking mechanism also includes two locking arms 16, each of which is pivotally connected by a pin 17 to the lower end of a respective leg 4 for swinging movement between the legs 4. Each locking arm 16 has a projection 18 extending laterally outwardly of the leg to which the arm 16 is connected, and this projection 18 is pivotally connected by a pin 19 to one end of a link 21, which extends substantially parallel to the adjacent leg 4 on the outside thereof. The other end of each link 21 has a slot 22 in which slides a pin 23 extending between the adjacent end portions of the side members 8 of the cross frame 7 on the outside of the legs 4. The locking arms 16 (other than the portions adjacent the pivot points) have a rounded cross section.

In use, the shackle is suspended from an overhead conveyor (not shown) in known manner, and the weight of the locking mechanism maintains the various parts in the position shown in FIG. 1 with the locking arms 16 in an upwardly extending closed position. An operator then secures a chicken or turkey to the shackle by forcing the legs of the bird upwardly against the latch 12 to cause upward movement of the latch 12 and the cross frame 7. This causes the latch 12 to move vertically above the locking arms 16 and also causes the pins 23 to move to the upper ends of slots 23. Further upward movement of the cross frame 7 then causes upward movement of the links 21 with consequent rotational movement of the locking arms 16 inwardly and downwardly. The legs of the bird then pass into the space between each locking arm 16 and its respective leg 4, and the locking mechanism returns by its own weight to the closed position shown in FIG. 1, in which the legs 24 of the bird are wedged between each locking arm 16 and leg 4. The weight of the poultry will cause each locking arm 16 to be urged towards the open position, but movement of each arm 16 in this sense is limited by the walls 14 of the movable latch 12.

The latch 12 is made movable relative to the cross frame 7 since it is possible that, when the locking mechanism is returning under its own weight to the closed position, the disc 5, bar 6, cross frame 7 and latch 12 may reach their closed positions before the links 21 and locking arms 16 reach theirs. If this happens, the locking arms 16 hit the base 13 of the latch 12, as they move towards the closed position, and force the latch 12 upwardly relative to the cross frame 7. In this way, the locking arms 16 move past the latch 12 to their closed positions, and the latch 12 then drops back to its lowermost position to prevent opening movement of the locking arms.

The shackle with the bird attached moves along with the conveyor, and the bird undergoes the required stages in its processing. After these stages, a cam of known kind engages the trip 5 and moves it upwardly, with consequent upward movement of the cross frame 7 and latch 12. When the latch 12 has moved upwardly sufficiently to clear the locking arms 16, the locking arms 16 are moved inwardly towards one another by the weight of bird. The legs 24 of the bird may or may not drop out of the shackle at this stage. As the disc 5 is continued to be moved upwardly by the cam, the pins 23 engage the ends of the slots 22, and the links 21 are then moved upwardly, with consequent angular movement of the locking arms 16 to the open position shown in FIG. 3 in which they are downwardly inclined. Thus, if the bird has not already dropped from the shackle, it will definitely do so at this stage.

It will be seen that the described shackle is suitable for use with poultry with different leg thicknesses, for example chicken or turkey. The bird is easily fitted into the shackle, whose locking mechanism operates under its own weight to firmly hold the bird, and upon release of the locking mechanism the locking arms move to such a position that the bird is bound to fall therefrom.

I claim:

1. A poultry shackle including a body having a pair of downwardly extending spaced legs, a pair of locking arms each pivotally connected to a respective leg, and a crossmember slidably mounted on the body, the crossmember being connected to each locking arm by a lost-motion connection, and the crossmember having a latch operable to maintain the locking arms in a closed position in which each arm extends upwardly between the legs from its pivotal connection to the respective leg such that poultry legs can be wedged between the locking arms and the legs of the shackle, and the crossmember being upwardly movable relative to the body to release the latch from the locking arms and, after taking up said lost motion, to cause downwardly angular movement of the locking arms away from the associated legs to a downwardly extending open position such that poultry falls from the shackle.

2. A shackle according to claim 1 wherein the latch is capable of a limited amount of movement relative to the crossmember to enable the locking arms to push past the latch if necessary during closing movement.

3. A shackle according to claim 1 wherein the body is formed of a strip of material shaped to provide said pair of downwardly extending spaced legs.

4. A shackle according to claim 1 wherein the crossmember is connected to each locking arm by a link with a pin and slot connection to provide said lost motion.

5. A poultry shackle including a body having a pair of downwardly extending legs, a pair of locking arms between said legs, each locking arm being pivotally connected to a respective leg, and a crossmember slidably mounted on the body, a pair of links located laterally outwardly of said legs and extending substantially parallel thereto, each link being pivotally connected to the crossmember and to the respective locking arms, at least one of the pivotal connections of each link being a lost-motion connection, and the crossmember having a latch operable to maintain the locking arms in a closed position in which each arm extends upwardly between the legs from its pivotal connection to the respective leg such that poultry legs can be wedged between the locking arms and the legs of the shackle, and the crossmember being upwardly movable relative to the body to release the latch from the locking arms and, after taking up said lost motion, to cause downwardly angular movement of the locking arms away from the associated legs to a downwardly extending open position such that poultry falls from the shackle.